Sept. 29, 1936.  B. P. SCHMANSKY  2,055,946
HEATER EQUIPPED WINDSHIELD WIPER
Filed April 22, 1936  2 Sheets-Sheet 2
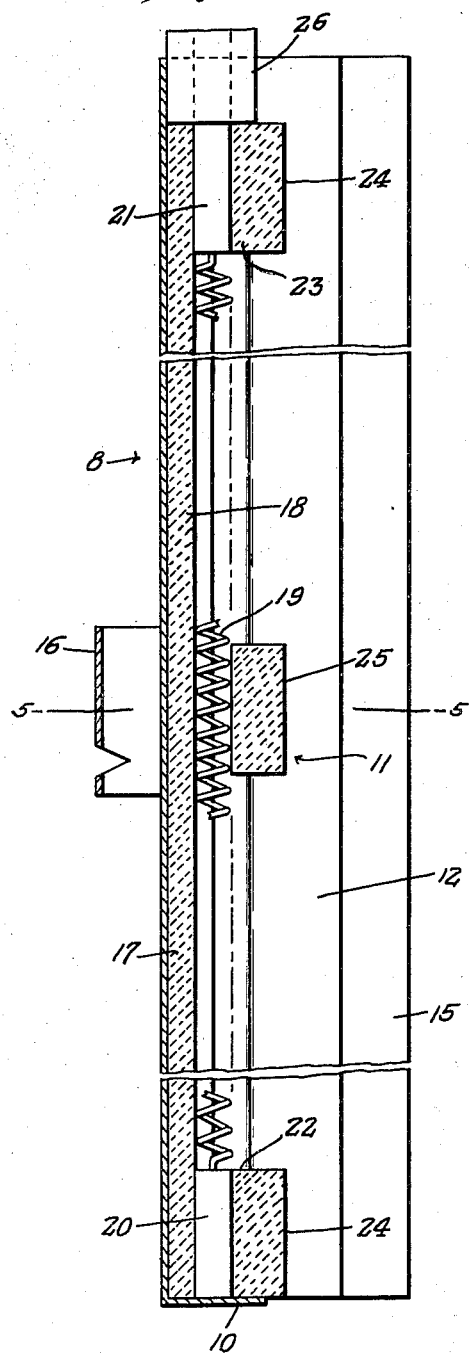
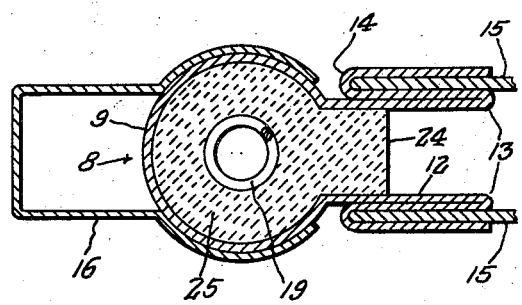
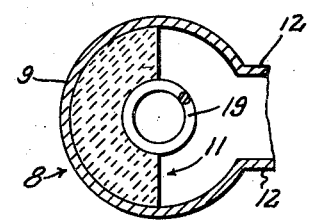
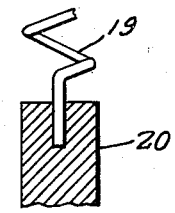
Inventor
*Barney P. Schmansky,*
By *Clarence A. O'Brien* and
*Hyman Berman* Attorneys Patented Sept. 29, 1936

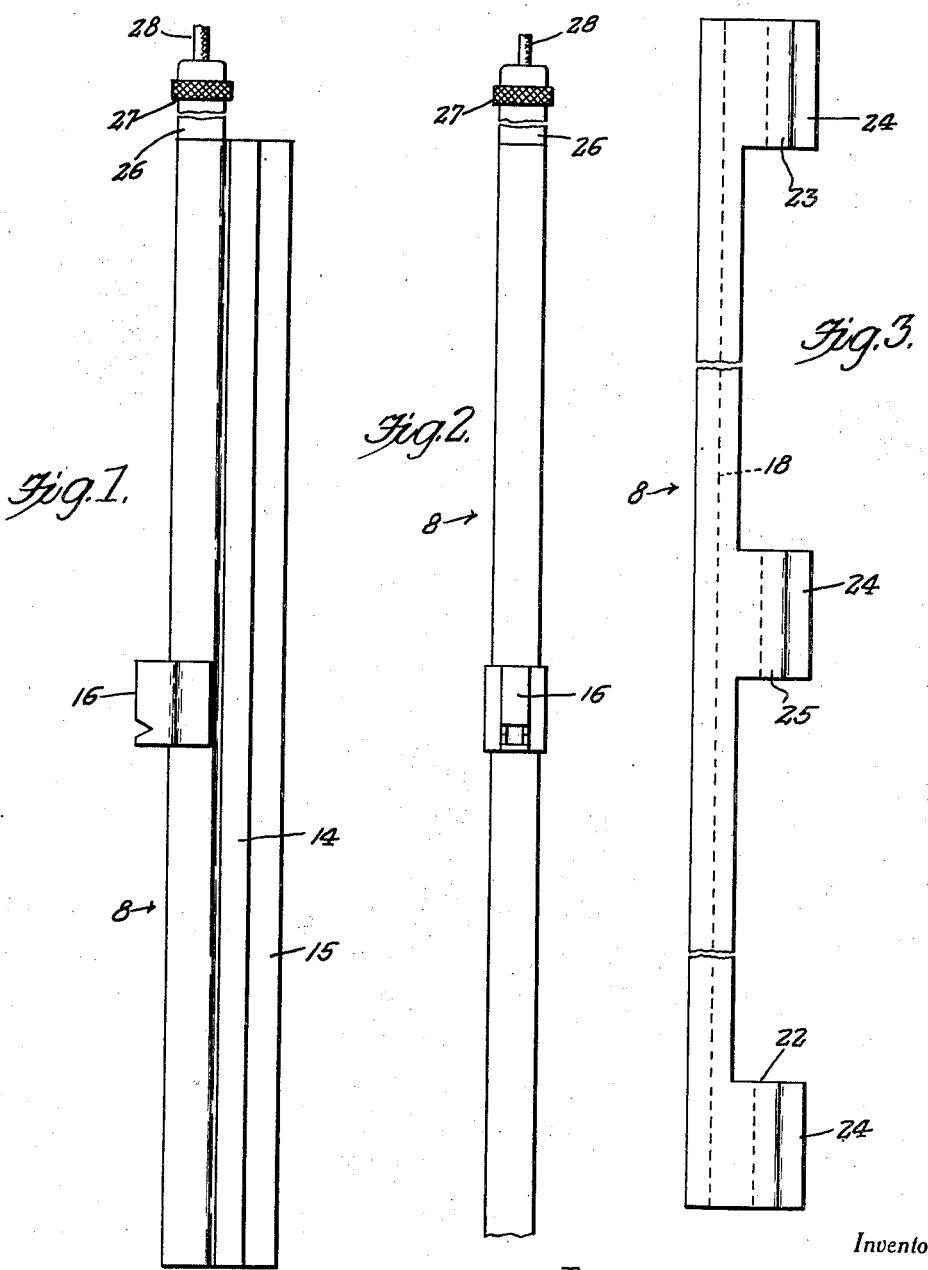

2,055,946

UNITED STATES PATENT OFFICE 2,055,946

HEATER-EQUIPPED WINDSHIELD WIPER

Barney P. Schmansky, Pontiac, Mich.

Application April 22, 1936, Serial No. 75,829

1 Claim. (Cl. 219—19)

The present invention is broadly classifiable as a windshield wiper, and has reference in particular to a composite multiple-purpose duplex blade and carrier construction.

In reducing the principles of the present inventive conception to definitely practicable form, the resultant product may be said to be of a combination type characterized in particular by spaced parallel wiper elements and a properly coordinated built-in electric heater satisfactorily usable to facilitate removal of water, sleet, frost, and snow from conventional windshields and other flat automobile body glass.

In contrast to prior patented and marketed structures in the same line of endeavor it will be discerned that the relative novelty is essentially structural in character. It follows, therefore, that one feature of the specialized development has to do with a well balanced, aptly fitted, sheath-like fixture which constitutes the so-called swingable arm, and which is herein provided with a pair of composition, simultaneously usable wiper elements spaced apart to permit the heated air to be confined and passed therebetween to impinge on the glass to heat it for defrosting and condensation removal purposes.

Additionally, novelty is predicated upon the provision of this tubular or cylindrical type sheath which constitutes a holder and carrier for a special built-in insulator which is in effect a holding core for a disposable and/or renewable type electric heating coil or unit.

Then, too, novelty resides, it is believed, in the utilization of an especially constructed disposable electric heating coil unit readily accessible and properly coordinated with the holding core to insure dependable and satisfactory results under virtually all conditions within reason.

Other features and advantages will become more readily apparent from the following description and the accompanying illustrative drawings.

In the accompanying drawings, wherein like numerals are employed to designate corresponding elements and details throughout the views:

Figure 1 is an elevational view of a windshield wiper constructed in accordance with the principles of the present inventive conception;

Figure 2 is an edge elevational view thereof observing Figure 1 in a direction from left to right;

Figure 3 is a fragmentary elevational view of the especially designed insulator core serving as the mounting or receptacle for the disposable heating coil;

Figure 4 is a contracted sectional and elevational view prepared to illustrate the internal construction of the device;

Figure 5 is a horizontal section taken approximately on the plane of the line 5—5 of Figure 4;

Figure 6 is a similar horizontal section through another portion of the structure;

Figure 7 is a fragmentary view showing the lower current grounding tip or terminal of the heating coil.

Referring now to the drawings by differentiating reference numerals, it will be observed that the aforementioned wiper arm is specifically in the nature of a casing-forming sheath 8. It is fashioned from sheet metal of appropriate character, and the body portion 9 is of vertically elongated cylindrical form and provided at its bottom with a laterally bent rest 10. The opposite upper end is open to permit introduction and removal, if necessary, of the insulator core 11. Before considering the details of the core or electric heating element, attention is called to the outstanding spaced parallel flanges 12 terminating in return bends 13 with the free edges converted into duplicate channels 14 constituting holders or grips for the duplicate wiper elements 15. Incidentally, these elements are made of suitable composition material which is substantially waterproof and heat-resisting. The numeral 16 designates an adapter clip, of suitable construction, carried by the casing or shell 8 and designed to accommodate the customary power-driven operating arm (not shown).

Considering now the core unit 11, it is understood that this is constructed of suitable insulation material such as for example porcelain. It is of a length substantially commensurate with the tubular or cylindrical sheath 8 and the major portion thereof indicated at 17 is substantially semi-cylindrical in cross-sectional form and provided with an accommodation groove or channel 18 for the resistance heating coil 19. The coil 19 is provided at opposite ends with adapter terminals 20 and 21, the lower one of which fits into the socket or receptacle 22 at the lower end of the insulator. The upper terminal 21 fits into a similar correspondingly located receptacle 23 extending through and beyond it, as shown. Both of these receptacles are formed with outstanding stabilizing lugs 24 which fit between the flanges 12 and constitute spacing elements. The similarly constructed central guide or holder 25 constitutes a guide for the adjacent portion of the coil 19. Thus, we have in effect a disposable heating coil fitted into the longitudinally spaced guide and retention sockets 22, 23, and 25, these having spacing lugs fitting between the flanges 12, and cooperating nicely with the channel 18 to provide an effective holder for the coil allowing the heat waves to radiate therefrom and to pass between the flanges and wiper elements into contact with the windshield glass (not shown).

It will be noticed that the upper terminal of the coil is attached to a fitting 26 having a waterproof cap 27 connected thereto, the cap carrying the current conductor cable or cord 28. Thus, the current enters at the upper end and is grounded at the points 10 and 20, as indicated in Figure 4.

Attention is called to the following summary of structural features and advantages:

1. A windshield heater wiper and defroster composed of a long cylindrical housing opening on one side between two flanges holding the wiper blades made of a composition and containing a coil heating element held by a porcelain support running the entire length of the housing and grounding at the lower end of the housing.

2. A porcelain support for the element that is firmly pressed into the housing so as to become virtually a unit in construction.

3. A removable heating element which may be removed from the assembly without removing the porcelain supports.

4. A heating element composed of a single coil of wire grounding by means of a contact point at the lower end of the housing and connecting to a detachable plug at the upper end of the housing.

5. A heating element producing sufficient heat to defrost the inside of the windshield, as well as remove ice from the outside.

6. A detachable plug for connecting the heating element with the source of current and closing the upper end of the housing to prevent water from entering at that place.

7. And a bracket firmly attaching the wiper assembly to the arm on the wiper mechanism.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A device of the class described comprising a metallic sheath embodying a longitudinally elongated cylindrical body portion provided with a grounding and stop element at one end, open at its opposite end, and completely open along one longitudinal side and fashioned with a pair of spaced parallel flanges, said flanges terminating in return bends and duplicate externally disposed wiper grips, wiper elements arranged in said grips in spaced parallel order, an insulated core removably fitted in said cylindrical body, said core being open at each end and along a portion of its longitudinal wall, spaced projections at the open side of the core and fitted between the flanges of the body to prevent relative rotation between the core and body, and a heating coil removably inserted in the core, said coil embodying terminals at each end, one of said terminals engaging the grounding element of the body and the other terminal serving as a connector for an electric wire to energize the coil.

BARNEY P. SCHMANSKY.